Aug. 22, 1933.     F. B. YINGLING     1,923,469
TILE MEASURING AND SORTING MECHANISM
Filed March 28, 1929     6 Sheets-Sheet 6
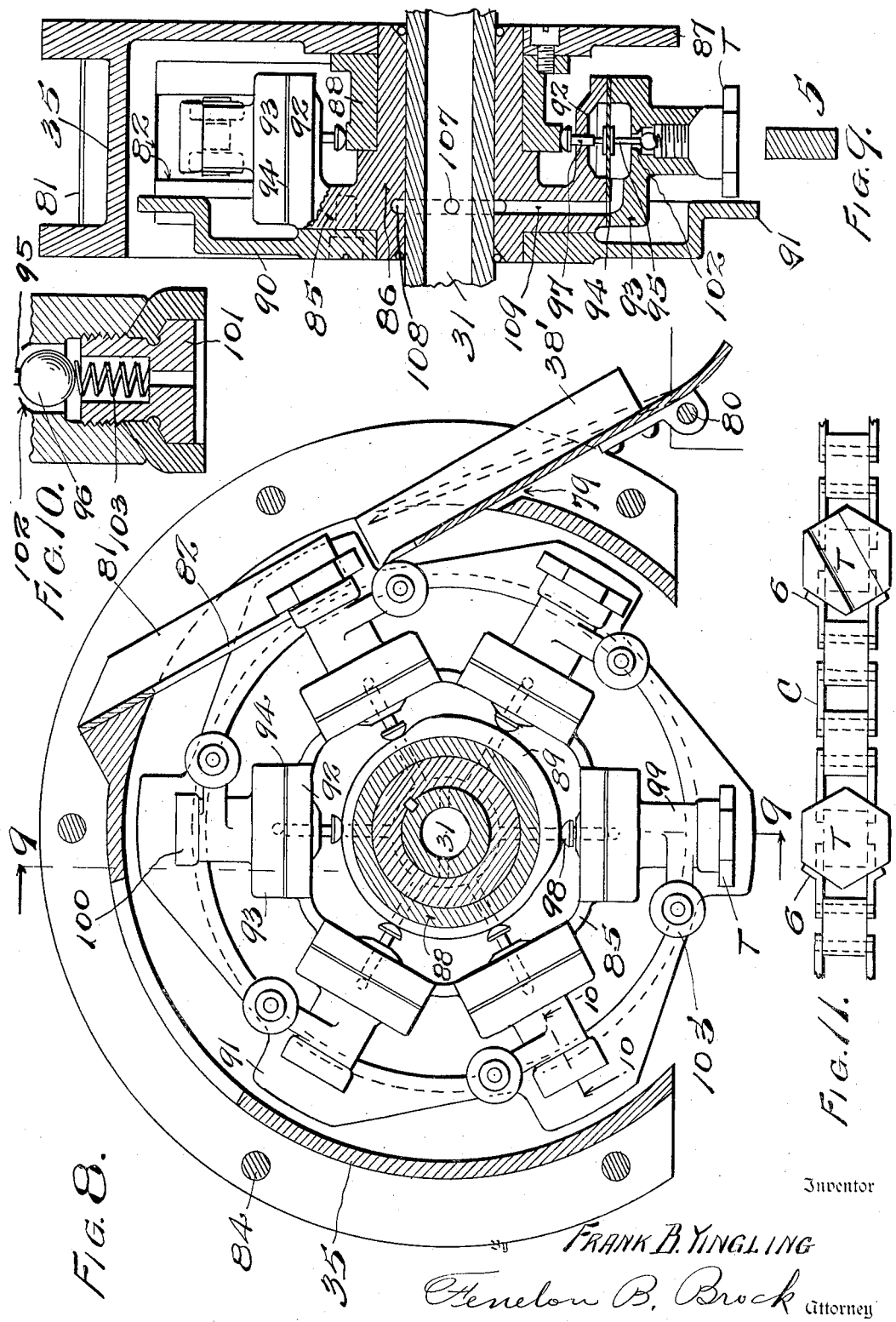
Inventor
FRANK B. YINGLING
Fenelon B. Brock  Attorney Patented Aug. 22, 1933

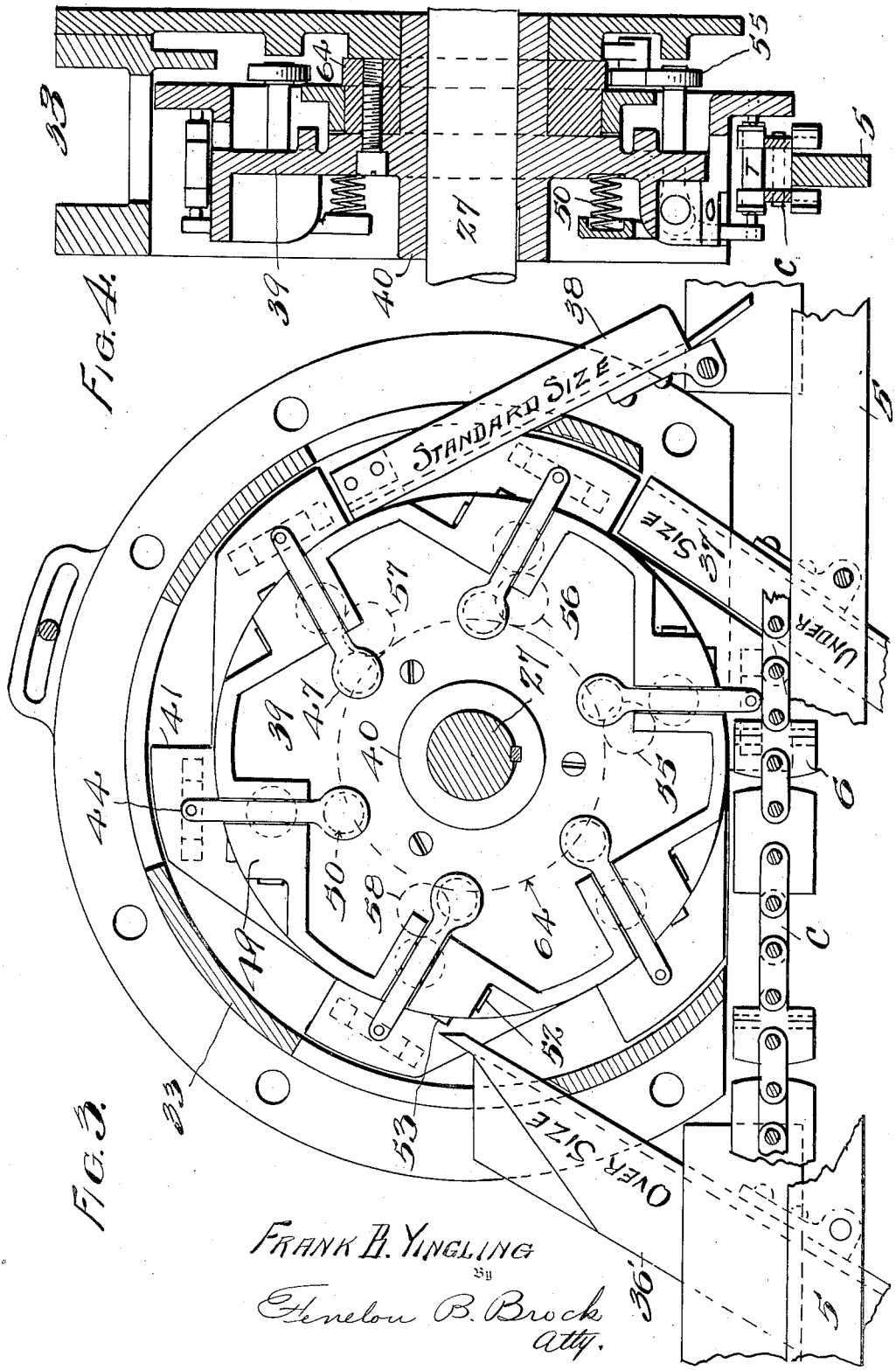

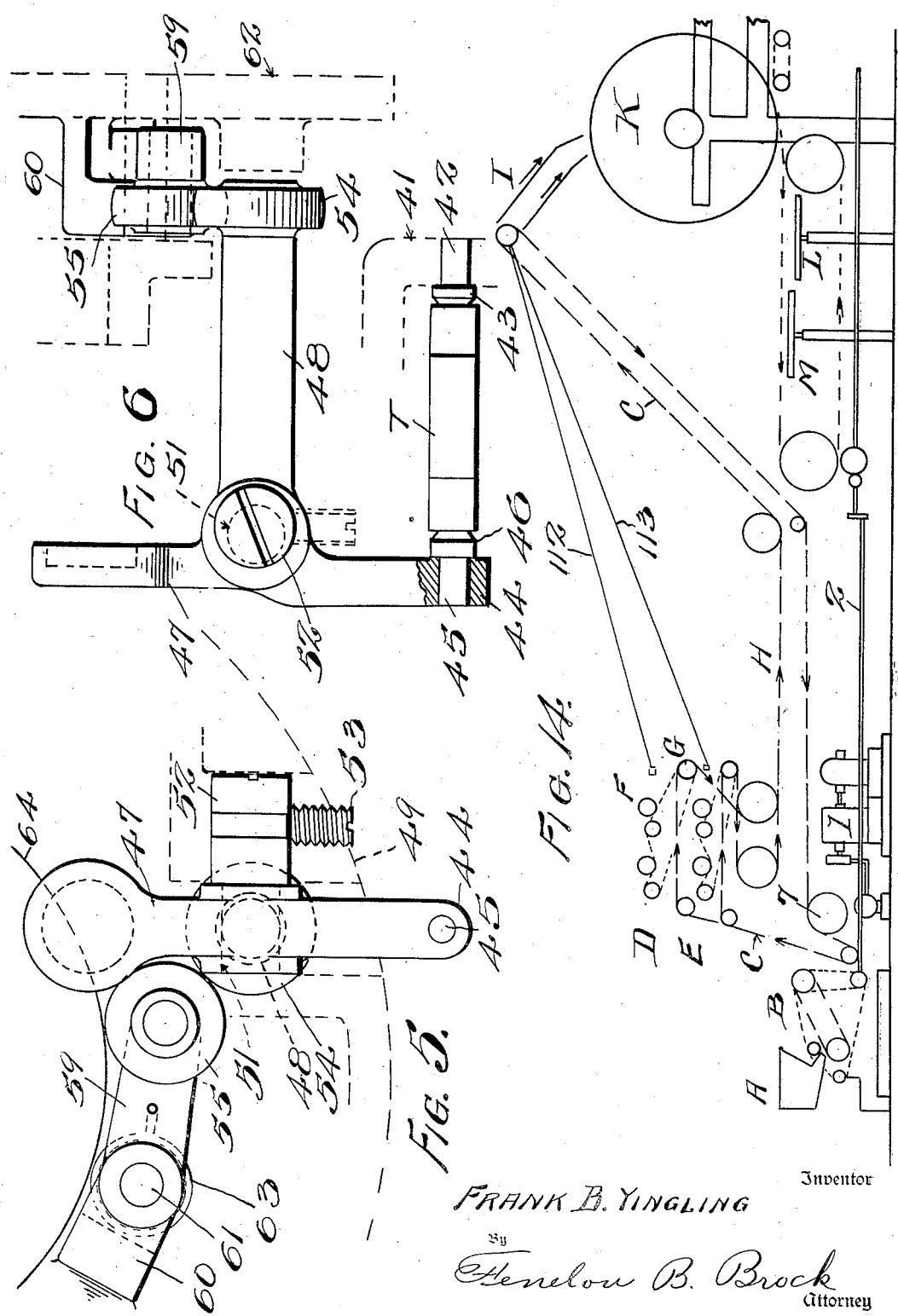

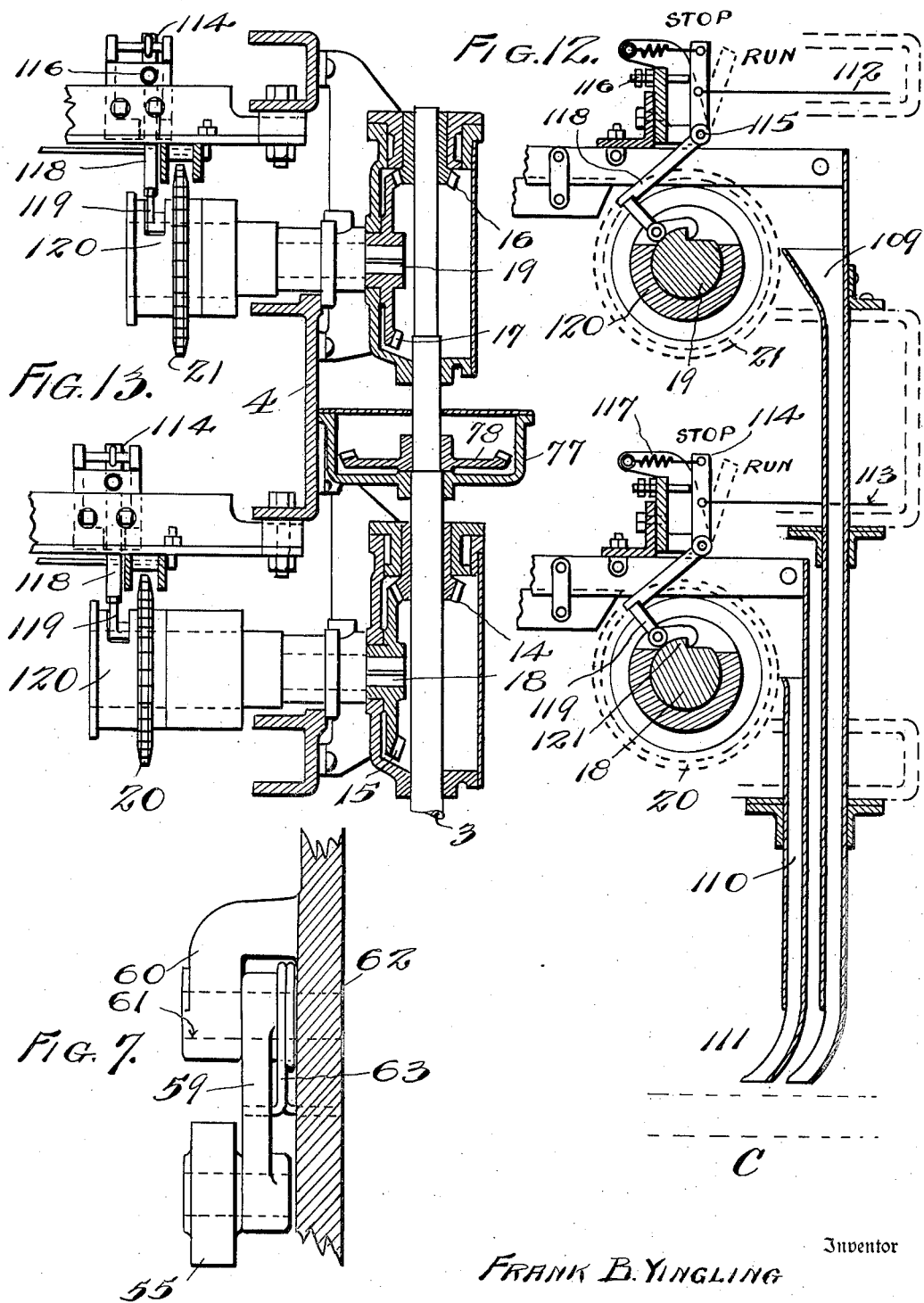

1,923,469

UNITED STATES PATENT OFFICE 1,923,469

TILE MEASURING AND SORTING MECHANISM

Frank B. Yingling, Hamilton, Ohio, assignor to Ceramic Machinery Co., Hamilton, Ohio Application March 28, 1929. Serial No. 350,718

7 Claims. (Cl. 209—89)

The mechanism set forth as the subject matter of the present invention forms a part of the tile assembling and pasting machine illustrated and claimed in my co-pending application for patent Ser. No. 710,383, filed May 21, 1924.

In the assembling and pasting mechanism referred to the tile are deposited in bulk in a hopper and fed therefrom, by endless carriers, to an endless conveyer chain or chains, and these conveyer chains supply the tile to the measuring and sorting mechanism of the present invention.

In the measuring and sorting mechanism the tile are measured:—The oversize and undersize tiles are automatically rejected and removed from the machine, and the standard size tile are retained. The standard size tile, which may require turning over, after leaving the measuring devices, are then turned over in order that the proper side or face will be "up" when the tile are restored to the conveyer chains or conveyers. In both the measuring and turning-over devices automatically operated means are provided for manipulating the tile. In the measuring device all of the tile are removed from the conveyers, in succession, and successively disposed of, the standard size tile being returned to the conveyers, while in the turning-over device only those tile requiring a reversal of position are removed from the conveyers, turned over and returned to the conveyers.

The measured and sorted tile are then conveyed by the same conveyer or conveyers and caused to pass along an inspection station for examination and inspection as to defects, color, &c, and the defective or undesirable tile are removed from the conveyer by hand.

From the inspection station the tile are conveyed on the endless conveyers heretofore mentioned to distributing stations, and from these distributing stations the tile are distributed to the assembly drum. On this drum, as it rotates, the tile are pasted on sheets, as paper, and after leaving the assembly drum, the sheets of tile are stacked for commercial use.

The endless conveyers utilized for the tile are chains, and while I have shown only six parallel endless conveyers carrying six rows of tile to the assembling drum, it will be understood that this showing is only a matter of convenience in illustrating the invention. The number of chains or rows of tile utilized depends upon the width of the completed sheet of tile emerging from the delivery end of the assembling and pasting machine.

A double deck arrangement of the measuring and sorting mechanism is illustrated and it will be understood that only a single-deck may be used, or if desired, the number of decks may be increased, depending upon the capacity required of the machine.

Some tile are manufactured with double faces, either of which may be the exposed face when laid in a floor, or set in a wall. Such tile, after being measured, pass directly past the turnover mechanism or they can be turned over, if desired. Other tile, which are manufactured with a single smooth flat face that is to be exposed, and a roughened or grooved back that is to set in the cement of the floor or wall, may or may not require turning over.

Thus if the latter tile approach the turnover device with their backs up, they pass the device, but those tile that approach the turnover device with their faces up, are automatically removed from the conveyer, turned over, and returned to the conveyer, thus insuring that the tile emerging from the turnover device shall all rest upon the conveyer chains with their backs up. Later on, all of the tile are turned over, to bring their faces up.

As here shown the tile are hexagonal in shape, but it will be obvious that the machine is capable of handling and assembling on pasted sheets, square, rectangular, and other commercial shapes of tile.

The tile are dumped in bulk in the hopper, and by means of the conveyer chains they are automatically arranged in orderly rows, each tile with two of its diametric points alined with the direction of travel of the chain, and these parallel rows of tile on the parallel chains are presented to the station I for distribution to the assembly drum K.

In the accompanying drawings I have illustrated one complete example of the physical embodiment of my invention, wherein the parts of the machine are combined and arranged according to one mode I have devised for the practical application of the principles of my invention, but it will be understood that various changes and alterations may be made therein, without departing from the principles of my invention.

Figure 3 is an enlarged longitudinal vertical sectional view through the measuring and sorting mechanism, and Figure 4 is a vertical cross sectional view of the mechanism.

Figure 5 is an enlarged detail view showing one of the tile conveyers with parts in dotted lines, and Figure 6 is a detail view as seen from the right in Figure 5.

Figure 7 is another detail view showing one of the actuating rollers of Figures 5 and 6.

Figure 8 is a longitudinal, vertical, sectional view of the turning mechanism for the tile, and Figure 9 is a vertical sectional view at line 9—9 of Figure 8.

Figure 10 is an enlarged sectional view of one of the suction carriers in the timing mechanism.

Figure 11 is a detail plan of a portion of the tile conveyer showing a couple of tile thereon.

Figure 12 is an enlarged detail, longitudinal, vertical sectional view of the right side portion of Figure 1 showing a part of the control mechanism for the measuring and sorting devices.

Figure 13 is a detail sectional elevation looking from the left in Figure 12.

Figure 14 is a diagrammatic view showing a side elevation of a tile assembling machine of which the present invention forms a part.

Figure 1:
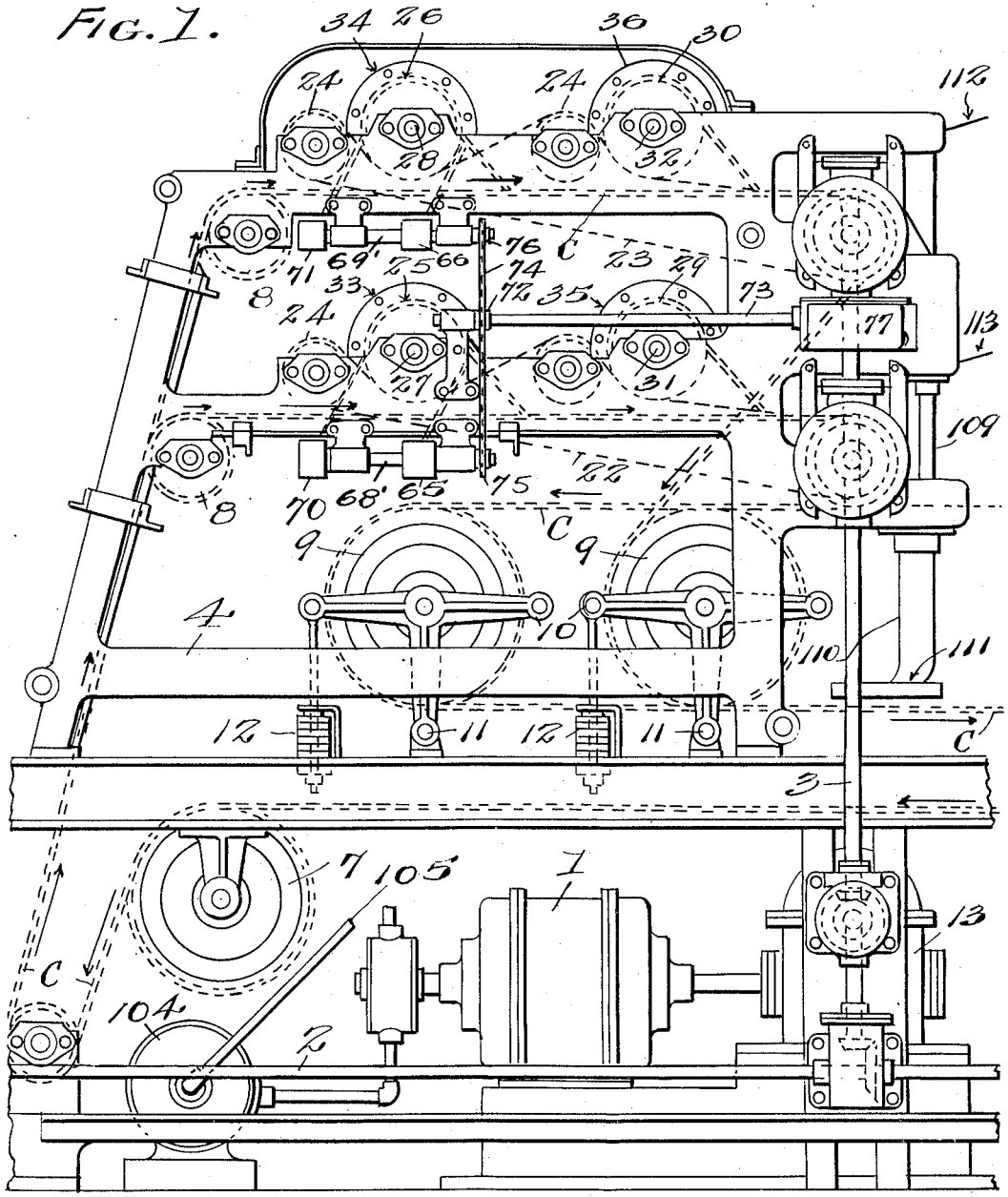
Figure 1 is a conventional view, in side elevation, showing the double deck measuring and sorting mechanism.

In order that the relation and utility of parts may readily be understood, reference should first be had to Figure 14 where the hopper is designated A, and the tile are supplied thereto in bulk.

From the hopper the tile are fed by endless carriers arranged in rows and designated B, to the conveyer chains which are indicated, each as a whole, by the letter C.

These conveyer chains are arranged in parallelism and they convey the tile through the double deck measuring devices D and E and their turning devices F and G. From the turning devices the tile are conveyed on the same endless conveyer chains C past the inspection station H, where defective or undesirable tile are manually removed by an inspector, and then the tile are elevated by the conveyers C to chutes I, where the tile leave the endless conveyer chains C, and the latter return to the measuring and sorting devices. The tile then pass down chutes I to the assembly drum K, where they are pasted in sheets on the paper strips, and these sheets of pasted tile are then carried on endless carriers to the two stackers L and M.

Power for the entire machine is derived from the motor 1, which operates a horizontal line shaft 2 from which the rotary measuring and turning mechanisms are driven by means of the vertical power shaft 3 that is journaled in suitable bearings mounted at the front of the main frame 4 of the machine.

As seen in Figure 14 the endless conveyer chains C for the tile T travel from the feed carriers B of the hopper A to the chutes I and these conveyer chains traverse the interior parts of the double deck measuring devices D and E and the complementary turning devices F and G.

The endless conveyer chains are guided where necessary by stationary, horizontal rails 5, and spaced links, as 6 of the conveyer chains are formed as carriers for the tile. Each chain has a large sprocket wheel 7, and guide sprocket wheels 8 are located at necessary points to change the course of travel of the chains or conveyers.

Figure 2:
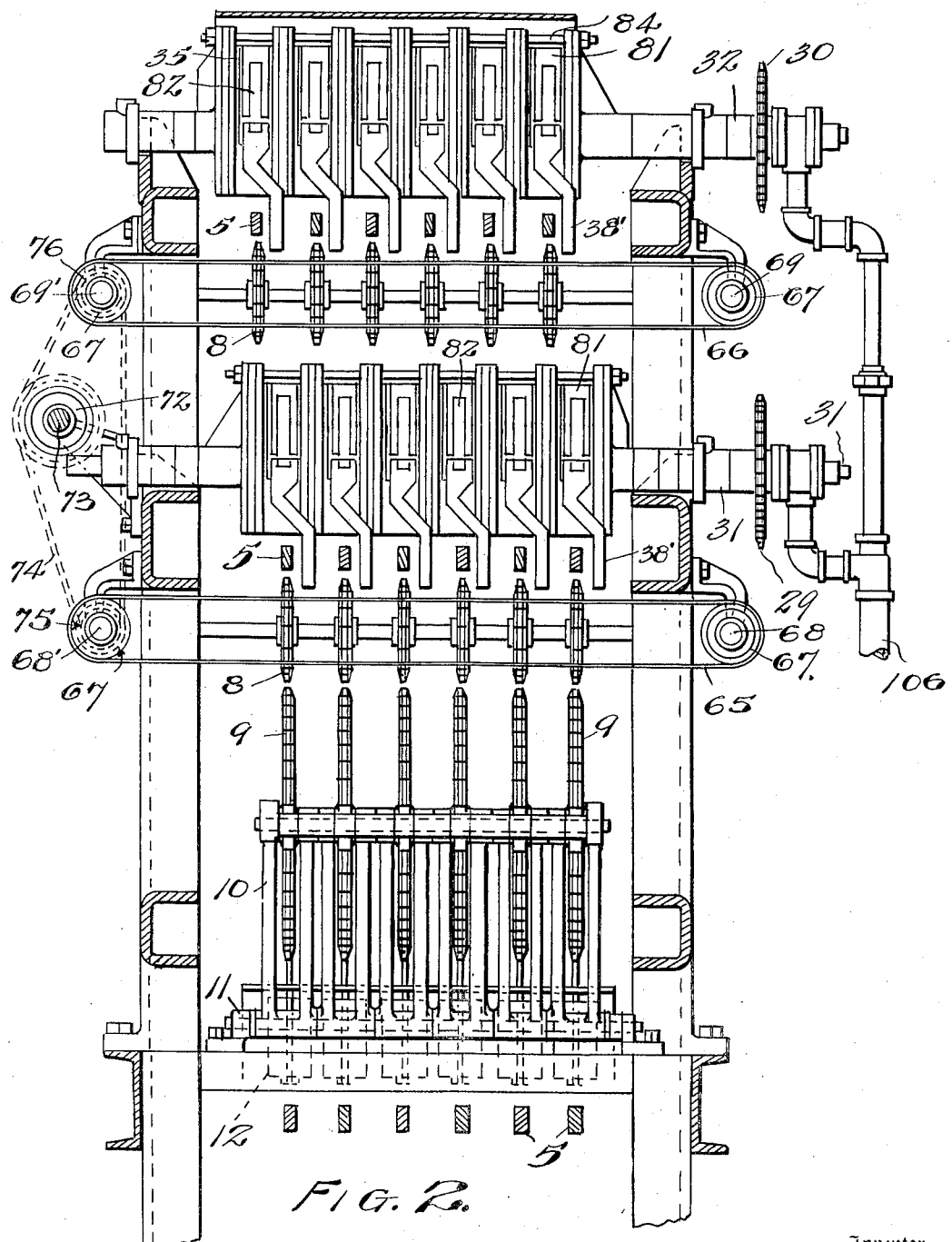
Figure 2 is an enlarged elevation as seen from the right in Figure 1 of the measuring and sorting mechanism, with parts in cross section.

For holding the conveyer chains taut and taking up slack, I utilize two sets of chain tighteners, Figures 1 and 2, that include large sprocket wheels 9 having their shafts journaled in yokes 10, and the yokes are pivoted at 11 in the frame 4. Counterweights 12 are suspended from the free ends of the yokes and these counterweights compensate for variations in the lengths of the conveyers C and hold them to the proper degree of tautness for properly conveying the tile.

In Figures 1, 12, and 13, of the drawings the driving and transmission mechanisms for operating the measuring and turning devices, together with the automatic control devices for starting and stopping the rotary mechanisms of these two devices, are illustrated.

By means of suitable reduction gearing in the casing 13, power is supplied from the motor to the horizontal line shaft and also to the vertical power shaft 3, and the latter, through the reduction gears 14 and 15 and 16 and 17, operate the horizontal, cross countershafts 18 and 19 respectively of the double deck mechanism of the invention. These countershafts carry driving sprocket wheels 20 and 21, over which the driving sprockets or chains 22 and 23 pass, and the sprocket chains are guided over idle sprocket wheels 24. The chains are arranged to pass over and under the sprockets 26 and 25 on the shafts 27 and 28 of the measuring devices, and also over sprockets 29 and 30 of the shafts 31 and 32 of the turning-over mechanism.

The rotary measuring mechanisms are arranged side by side, one for each conveyer chain, within sectional housings 33 and 34, and the turnover mechanisms are enclosed within sectional housings 35 and 36, and it will be understood that each set of measuring devices has a complementary set of turnover devices.

The rotary measuring devices are arranged in a row, which row extends transversely of the machine, above the conveyer chains C, and of course a measuring device is provided for each conveyer chain C. Inasmuch as the measuring devices are duplicates, a description of the construction and operation of one such device will suffice for all of them.

Referring particularly to Figures 3 and 4, it will be seen that the chain C travels from left to right, guided over the rails 5 beneath the housing 33. The housings are of cylindrical shape and bolted together, and each housing is equipped with three inclined chutes, as 36', 37 and 38, arranged parallel with the direction of travel of the conveyer chains, and projected upwardly through slots in the housing. These chutes 36', 37, and 38 dispose of the oversize, undersize, and standard size tiles respectively after they have been measured by the rotary measuring device within the housing, all of the tile being picked up from the conveyer, but only the standard size tile being returned to the conveyer.

The measuring device includes a rotary carrier-wheel or disk 39 keyed at its hub 40 to the shaft 27 and located within the housing above and alined with the conveyer chain C from which the tile T are lifted. The oversize and undersize tile are disposed of as will hereinafter be set forth, but the standard size tile are returned to and deposited on the conveyer chain, the movement of the parts being timed so that the tile are deposited in the carriers 6 of the chain C.

The rotary carrier wheel is here shown as equipped with six radially disposed measuring devices, but of course this number may be varied as desired or necessary.

In Figures 3, 4, 5 and 6 it will be seen that each unit of the measuring devices co-act with a vertical flange 41 that is rigid with the carrier wheel or disk, and provided with a fixed peripheral pin 42 fashioned with a head 43 projecting slightly from the face of the flange. The flange forms a fixed jaw of the measuring device, and each fixed jaw has a complementary movable jaw 44 equipped with a pin 45 having a head 46 spaced from and alined with the fixed pin head 43.

As best seen in Figure 6 the tile is grasped or gripped between the two pin heads of the two jaws, and lifted from the conveyer chain as the measuring device revolves with the carrier wheel.

The movable jaw forms part of a T-shaped lever having an integral spring arm 47 and a lever arm 48, and is pivoted in a lug 49 of the carrier disk. A spring 50 is interposed between the free end of the spring arm and the adjoining face of the disk for the purpose of urging the movable jaw toward the fixed jaw to grip the tile and hold it after it is lifted from the chain C.

The T-lever is adjustable, and is pivoted on a pin 51 having an eccentric head 52 that is capable of being turned in bearings in the lug 49, and a set screw 53 is provided in the lug for fixing the head and its eccentric pin in adjusted position in the lug.

The movable jaw is closed to grip the tile by the action of the spring 50 on the T-lever, and the jaw is moved to release the tile through the medium of a control roller 54 journaled on the end of the lever arm 48, and these rollers control the measuring of the tile.

These control rollers, as they revolve with the carrier wheel, contact at certain points with cam rollers as 55, 56, 57 and 58, indicated by dotted lines in their proper places in Figure 3. These respective rollers 55, 56, 57 and 58 perform the function of opening the jaws of the grip, first preparatory to gripping the tile; to release the undersize tile; to release the standard size tile; and to release the oversize tile. The released undersize and oversize tile slide down the chutes 37 and 36; and the standard size tile slide down the chute 38 to the conveyer chain, C.

By means of the eccentric journal bearings for the T-levers each lever is separately and independently adjusted to cause the proper contact between a control roller and the cam rollers, for the performance of these various functions.

One of the four similar cam devices is illustrated in Figures 5, 6, and 7, where the cam roller, as 55, is journaled at the front end of a journal arm 59 that is swiveled in a bracket 60 on a pin 61 rigid with the stationary back plate 62 of the housing 33, and a spring 63 coiled about the pin, with its free ends anchored to the swivel arm and to the back plate, holds the roller in running contact with a circular base ring 64, rigidly fixed at the back face of the carrier disk, to revolve therewith.

The back plate 62 and the brackets thus form a stationary support for the rollers 55, 56, 57, and 58, and the springs 63 hold the rollers in rolling contact with the revolving base ring. The rollers form anti-friction cams or obstructions in the path of the particular control rollers, and the latter are thus engaged to rock the T-levers and open the respective grips to release tile at the proper predetermined times.

In Figure 3, for purposes of illustration, five of the grips are carrying tile shown in dotted lines, and in Figure 4 two of the grips are shown engaging the tile.

The undersize tile are released by action of rollers 56 and 55 and these tile slide down the chute 37 to a transversely arranged endless conveyer belt 65, or 66, travelling beneath the measuring mechanism, over pulleys 67 on shafts 68 and 69 and 68' and 69' which are journaled in bearings at the rear and front sides of the machine.

The oversize tile are released from their grip by co-action of rollers 55—58, and the tile slide down chute 36 to another pair of laterally moving endless belt conveyers 70 and 71 supported on pulleys 67 of the shafts 68, 68' and 69, 69'. Shafts 68' and 69' are driven by a drive sprocket 72 on shaft 73, chain 74 and smaller sprocket wheels 75 and 76 on shafts 68' and 69' as best seen in Figure 2.

The shaft 73 extends along the front of the machine to the gear case 77 where it receives power from the shaft 3 through a gear couple including the gear wheel 78 in Figure 13.

The standard size tile having been restored to the conveyer chains C through chute 38, now pass beneath the double deck, rotary pneumatically operating turnover mechanisms F and G. Tile having a single "face" and approaching the turnover mechanism face up are lifted from the conveyer chains, turned over, and restored to the chains C so that all tile emerging from the turnover mechanism are carried on the chains with their "faces" down, but before reaching the assembly drum they are again reversed, as will be described.

In Figure 11, the tile to the right with its "back" up remains on the conveyer chain, due to the fact that its back is too rough for the pneumatic carrier to lift by suction, while the tile to the left is picked up by suction and turned over.

Each turnover device comprises housings 35 and 36, the former being slotted at 79 to accommodate the chute 38', which chute is pivoted at 80 on the main frame of the machine. Above the chute is arranged a fixed slide, and guide plate 81, having a central slot 82 and attached to the housing to form an alined extension of the pivoted chute. The housings are flanged and bolted together in a row extending transversely of the machine, some of the bolts being indicated at 84.

Within the two sets of housings 33 and 35 are supported the transversely extending tubular shafts 31 and 32 and each turnover device includes a rotor or wheel 85 with its hub 86 keyed to the shaft 31 or 32. The housing has a back plate 87 to which a bushing 88 is secured, and this bushing which encircles a portion of the hub, has a cam ring or exterior flange 89 thereon by means of which the several pneumatic, suction carriers mounted on the wheel 85 are operated.

At the front of the wheel a circular plate 90 is attached, and this plate has a plurality of inset lugs 91, which, as the wheel rotates, successively engages and swing outwardly the upper end of the pivoted chute 38', out of the path of the approaching tile, as indicated by dotted lines. After the tile has passed the chute, the latter returns by gravity to normal position to receive the tile (that has just passed it) from the slide plate 82.

The turnover wheel, as here shown, has mounted thereon, six carriers, radially arranged about its center, and these carriers successively pick up the tile from the conveyer chains.

Each carrier comprises a hollow base 92 fashioned integral with the wheel, and a complementary hollow head 93 is secured thereto with a resilient diaphragm 94 secured between these members. A valve stem 95 is secured to the diaphragm and projects at both sides therefrom within the suction chamber of the carrier. At one end this stem is provided with a ball valve 96 and the other or short end of the stem at the opposite sides of the diaphragm, contacts with the inner end of a pin 97 carried by the base 92. The pin has a rounded head 98 that rides around the stationary cam ring 89.

The head 93 is fashioned with an outwardly extending bushing 99 in the outer open end of which a rubber vacuum cup or suction cup 100 is carried. The suction cup is secured in the bushing by means of a hollow screw plug 101 having a seat 102 for the ball valve 96, and a spring 103 is carried within the plug for normally holding the valve closed.

Each carrier is provided with a pair of rollers 103' journaled thereon, and these rollers are in position to contact with the upper face of the conveyer chain C and depress the chain slightly out of the path of the tile that has been picked up by the suction cup of the carrier.

The springs 103 hold the valves normally closed, and as the suction carriers revolve with the wheel and successively approach the lower, vertically disposed position, in Figure 8, the pin heads 98 ride up on the cam 89, thereby pushing the ball valve 96 from its seat 102, and against the tension of the spring 103, to mechanically hold the valve open while suction is applied to the vacuum chamber in the carrier. This suction exerted through the hollow plug 101 and cup 100, picks up the tile and the tile is carried by the cup as long as the head 98 rides along the cam 89. Thus two tile are being carried by the cups in Figure 8. The lugs 91 move the chute 88' in advance of the approaching tile, and the cup and its pair of rollers 103' pass partly through the slot 82 of the slide plate 81. The slot however is too narrow to permit passage of the tile, and as the pin head 98 rides down off the cam 89 the valve 96 is opened to break the suction and to release the tile from the carrier. The tile has thus been carried between the ends of the chute (dotted lines) and the slotted slide plate 81 and laid over the slot on the exterior surface of the slide plate. After the lug 91 passes from under the chute, the upper end of the chute falls by gravity to full line position ready to receive the tile that slides by gravity from the plate 81 to the chute, and thence to the conveyer chain C.

The suction for the carriers is provided from a vacuum pump 104, Figure 1, and pipe 105, which pipe extends through the machine to the rear and is connected to a manifold 106, Figure 2. The manifold is connected with the two tubular shafts 31 and 32 of the double deck turnover mechanism, and in Figures 8 and 9 it will be seen that these shafts have radial ports 107 that communicate with an annular space 108 in the hub of the carrier wheel 85, and from these ports and the space, radial ducts 109 extend outwardly to the chambers of the suction carriers.

The check valves 96 of all of the carriers are closed after the pin heads leave the cam 89, as the wheel turns anti-clockwise in Figure 8, and of course the valves are positively opened by coaction of the pin heads on the cam.

After the sorted tile emerge from the turnover devices and have been restored to the conveyer chains C with their faces down, the tile are again temporarily separated from their conveyer chains, turned over, and laid on the conveyer chains with their faces up. This second turnover of the tile applies to all of them, and it is accomplished by means of chutes 109 and 110 shown at the right in Figures 1 and 12. The chutes are arranged in rows transversely of the machine, one chute to each conveyer chain, the long vertical chutes 109 receiving the tile from the upper deck and the shorter chutes 110 receiving the tile from the chains of the lower deck.

The chains C indicated by dotted lines move to the right in these figures of the drawings, and it will be seen that the lower ends of the chutes are curved or turned at 111 to the left. Therefore as the tile slide down the chutes with their smooth faces to the left, they slide out of the bottoms of the chutes and meet the carrier chains on which they are deposited with their faces up. After the tile reach the assembly drum a sheet of paper is pasted to the faces of the tile.

For a smooth running of the machine, it is essential that the starting, running, and stopping of the measuring and turnover mechanism, together with the movement of the conveyer chains C be co-ordinated with the feed of the tile to the assembly drum K from the reservoir at I. For the purpose of thus insuring an adequate supply of tile and for preventing an excess supply or feed of tile, I utilize control clutches for the driving shafts 18 and 19 (Figure 12) which are controlled by wires 112 and 113 from detector or "feeler" mechanism located at the station I in Figure 14. These wires 112 and 113 are connected to clutch control levers 114 (Figure 12) pivoted at 115 in brackets of the machine frame. The levers are shown in stop position, and they are held in such position against an adjustable stop bolt 116 by springs 117.

One arm 118 of each control lever is locate in the path of rotary movement of a pawl 119 pivoted on a clutch sleeve 120, and adapted to engage a shoulder 121 in the notched drive shaft 18 or 19 within this sleeve.

Thus the drive shafts, which receive power through the gear couples 14—15, 16—17 from the power shaft 3 drive the chains C and operate the rotary measuring and turnover devices through the clutches and driving sprockets of Figures 12 and 13.

Having thus fully described my invention, what I claim as new and desire to secure by Letters Patent is:—

1. The combination with a conveyer, of a rotary wheel, measuring devices carried by the wheel adapted to remove tile from the conveyer, means for returning standard tile to the conveyer, and means for turning over the standard tile on the conveyer.

2. The combination with a conveyer, a rotary wheel, and a pivoted chute, of a grip carried by the wheel, means for operating the grip to remove a tile from the conveyer, means on the wheel for removing the chute from the path of the tile, and means for opening the grip to release the tile to said chute.

3. The combination with a conveyer, a rotary wheel and a grip carried by the wheel, of a gravity actuated chute pivoted in the path of the wheel, a lug on the wheel for removing the chute in advance of a tile, and means for opening the grip to release the tile to said chute.

4. In a tile sorting machine the combination with a conveyer and a rotary measuring device, a rotory turnover device, and operating means therefor, of control means for starting and stopping said conveyer and devices.

5. In a tile sorting machine the combination with an endless chain conveyer, of a rotary measuring device for removing tile from the conveyer, and means for returning standard size tile to the conveyer, means for turning over selected ones of the standard tile and means for returning the overturned tile to the conveyer.

6. In a tile sorting machine, the combination with a conveyer, of a measuring device for removing the tile from the conveyer, means for returning standard size tile to the conveyer, means for turning over selected standard tile, and means for returning the overturned standard size tile to the conveyer.

7. In a tile sorting machine, the combination with an endless conveyer, of a rotary measuring device for removing tile from the conveyer, means for returning standard size tile to the conveyer, rotary means for removing some of the standard tile from the conveyer and means coacting therewith for overturning the removed tile, and means for returning the overturned tile to the conveyer.

FRANK B. YINGLING.